United States Patent

Pryjmak

[15] 3,700,988
[45] Oct. 24, 1972

[54] SPEED CONTROL SYSTEM FOR ALTERNATING CURRENT INDUCTION MOTORS

[72] Inventor: Bohdan I. Pryjmak, Dayton, Ohio
[22] Filed: May 27, 1971
[21] Appl. No.: 147,459

[52] U.S. Cl.................................318/227, 318/230
[51] Int. Cl.............................................H02p 5/40
[58] Field of Search..................318/225 R, 227, 230

[56] References Cited

UNITED STATES PATENTS 3,602,787  8/1971  Tuchen........................318/227
3,614,596  10/1971  Ford, Jr......................318/227

*Primary Examiner*—Gene Z. Rubinson
*Attorney*—Eugene W. Christen, Creighton R. Meland and Richard G. Stahr

[57] ABSTRACT

A speed control system for alternating current induction motors wherein a reference potential, which is a rectified phase of the alternating current supply potential, is connected across the series combination of a variable resistor and the timing capacitor of a unijunction transistor type relaxation oscillator circuit and a direct current control potential, which is a function of motor speed and which may be selectively varied in magnitude to change the speed of the motor, is connected across the variable resistor in the same polarity relationship as the reference potential. The unijunction transistor type relaxation oscillator circuit and associated circuitry produces a trigger signal at the electrical angle of each potential cycle of each phase of the alternating current supply potential as determined by the difference of magnitude between the reference and control potentials which trigger respective silicon controlled rectifiers conductive to complete an energizing circuit for the corresponding phase winding or the motor. Another capacitor, connected across the series combination of the variable resistor and the timing capacitor, establishes the difference of magnitude between the reference and control potentials at substantially zero upon motor start and increases the difference at a predetermined rate to a maximum as determined by the selected magnitude of the control potential.

3 Claims, 3 Drawing Figures

INVENTOR.
Bohdan T. Pryjmak
BY
Richard G. Stahr
ATTORNEY

SPEED CONTROL SYSTEM FOR ALTERNATING CURRENT INDUCTION MOTORS

The present invention relates to motor speed control systems and, more specifically, to a speed control system for alternating current induction motors which provides for the application of a minimum supply potential to the motor phase windings upon start.

Alternating current induction motors have discrete phase windings corresponding to each phase of a compatible alternating current supply potential which are energized by the phase of the alternating current supply potential to which they correspond. The number of coils per phase winding may vary depending upon the number of poles designed into the motor. Motors of this type normally operate at a constant, fixed speed which is determined by the frequency of the alternating current supply potential and the number of magnetic poles produced by the phase windings.

In certain applications where motors of this type may be advantageously used, it may be desirable to operate the motor at variable speeds. To change the speed of alternating current induction motors, it has heretofore been necessary to change the frequency of the alternating current supply potential or the number of magnetic poles produced by the phase windings. Both of these alternatives have been unsatisfactory in that that the former requires expensive frequency converting equipment and the latter provides, at best, step-by-step control through compound switching arrangements.

It has been found that the speed of alternating current induction motors may be smoothly adjusted over a wide range by controlling the electrical conduction angle during which each potential cycle of each phase of the alternating current supply potential energizes the corresponding phase windings. To reduce the speed, the respective phase windings are energized over a shorter electrical conduction angle of each potential half-cycle of the corresponding phase. For optimum operation at any speed, the conduction angle of the potential cycles of all phases should be equal to the conduction angle of the potential cycles of one of the phases selected to be the reference phase.

In another United States patent application, Ser. No. 493,652, filed Oct. 7, 1965, now U.S. Pat. No. 3,387,196, and assigned to the same assignee as that of the present application, a novel speed control system which may be used with any alternating current induction motor of the type having discrete phase windings corresponding to each phase of a compatible alternating current supply potential is disclosed in detail. Briefly, the speed control system so disclosed is responsive to a difference of magnitude between a direct current reference potential and a direct current control potential, which is not only a function of motor speed but is also independently variable to vary the speed of the motor, to produce an electrical trigger signal at the electrical angle of each potential half-cycle of each phase of the alternating current supply potential as determined by the selected motor speed for operating respective trigger signal responsive switching devices which establish respective phase winding energizing circuits when operated to close by the trigger signals. In this system, the greater the difference of magnitude between the reference and control potentials, the earlier during each potential half-cycle of each phase of the alternating current supply potential the corresponding motor phase winding is energized to increase the speed of the motor. Upon motor start, therefore, with a control potential of zero, each motor phase winding is energized substantially at the beginning of each potential cycle of the corresponding phase of the supply potential. Consequently, substantially full supply potential is applied across the phase windings of the motor at start. In many instances, particularly with integral horsepower motor ratings, this may cause intolerable transient conditions on the supply line.

It is, therefore, an object of this invention to provide an improved motor speed control system for alternating current induction motors of the type which produces electrical trigger signals at the electrical angle of each potential cycle of each phase of the alternating current supply potential as determined by the difference of magnitude between a direct current reference potential and a direct current control potential which are applied across the gate-cathode electrodes of respective silicon controlled rectifiers for triggering these devices conductive to complete an energizing circuit for the corresponding phase winding.

It is another object of this invention to provide an improved speed control system for alternating current induction motors of the type which produces an electrical trigger signal at the electrical angle of each potential cycle of each phase of the alternating current supply potential as determined by the difference of magnitude between a direct current reference potential and a direct current control potential for triggering respective silicon controlled rectifiers conductive to complete an energizing circuit for the respective phase windings of the motor wherein the difference of magnitude between the reference and control potentials is established at substantially zero upon motor start and is increased at a predetermined rate to a maximum as determined by the magnitude of the control potential.

In accordance with this invention, a motor speed control system for alternating current induction motors of the type which produces an electrical trigger signal at the electrical angle of each potential cycle of each phase of the alternating current supply potential as determined by the difference of magnitude between a direct current reference and a direct current control potential for triggering respective silicon controlled rectifiers conductive to complete an energizing circuit for the corresponding phase winding of the motor is provided wherein the difference of magnitude between the reference and control potentials is established at substantially zero upon motor start and is increased at a predetermined rate to a maximum as determined by the selected magnitude of the control potential.

For a better understanding of the present invention, together with additional objects, advantages and features thereof, reference is made to the following description and accompanying drawings in which.

The novel speed control system of this invention may be employed with any alternating current induction motor of the type having discrete phase windings corresponding to each phase of a compatible alternating current supply potential.

For purposes of illustrating the novel features of this invention and without intention or inference of a limitation thereto, the following detailed description will be in regard to both wye and delta connected three-phase alternating current induction motors.

To establish an energizing circuit for each motor phase winding across the corresponding phase of the alternating current supply potential, respective controllable switching circuit devices, which may be silicon controlled rectifiers, responsive to electrical trigger signals are provided.

Figure 2:
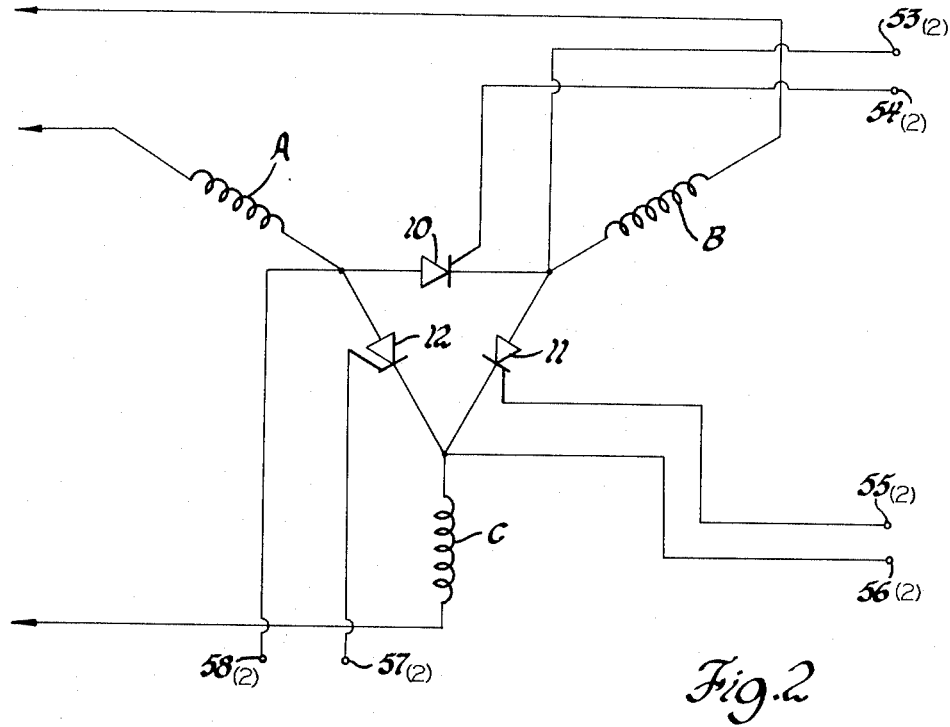
FIG. 2 is a schematic diagram of the switching system for a wye connected alternating current induction motor which may be used with the circuitry schematically set forth in FIG. 1.

In FIG. 2, silicon controlled rectifier 10 corresponds to phase A and, when conducting, completes an energizing circuit for the phase windings corresponding to phase A through the phase windings corresponding to phase B. Silicon controlled rectifier 11 corresponds to phase B and, when conducting, completes an energizing circuit for the phase windings corresponding to phase B through the phase windings corresponding to phase C. Silicon controlled rectifier 12 corresponds to phase C and, when conducting, completes an energizing circuit for the phase windings corresponding to phase C through the phase windings corresponding to phase A. With both silicon controlled rectifiers 10 and 11 conducting, phase A may feed both phases B and C; with both silicon controlled rectifiers 11 and 12 conducting, phase B may feed both phases C and A and with both silicon controlled rectifiers 12 and 10 conducting, phase C may feed both phases A and B.

Figure 3:
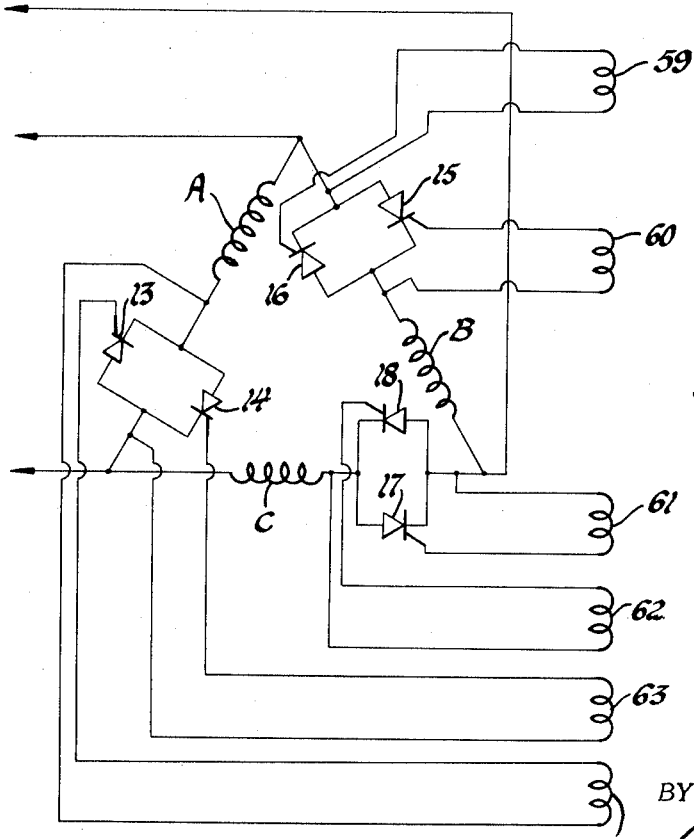
FIG. 3 is a schematic diagram of the switching system for a delta connected alternating current induction motor which may be used with the circuitry schematically set forth in FIG. 1.

In FIG. 3, the parallel combination of oppositely poled silicon controlled rectifiers 13 and 14 correspond to phase A and are connected in series with the phase winding corresponding to phase A, the parallel combination of oppositely poled silicon controlled rectifiers 15 and 16 correspond to phase B and are connected in series with the phase winding corresponding to phase B and the parallel combination of oppositely poled silicon controlled rectifiers 17 and 18 correspond to phase C and are connected in series with the phase winding corresponding to phase C.

With single- and two-phase applications, one and two switching devices, respectively, are required. With applications of more than three phases, one or two switching devices corresponding to each phase may be required depending upon the configuration in which the phase windings are connected.

Figure 1:
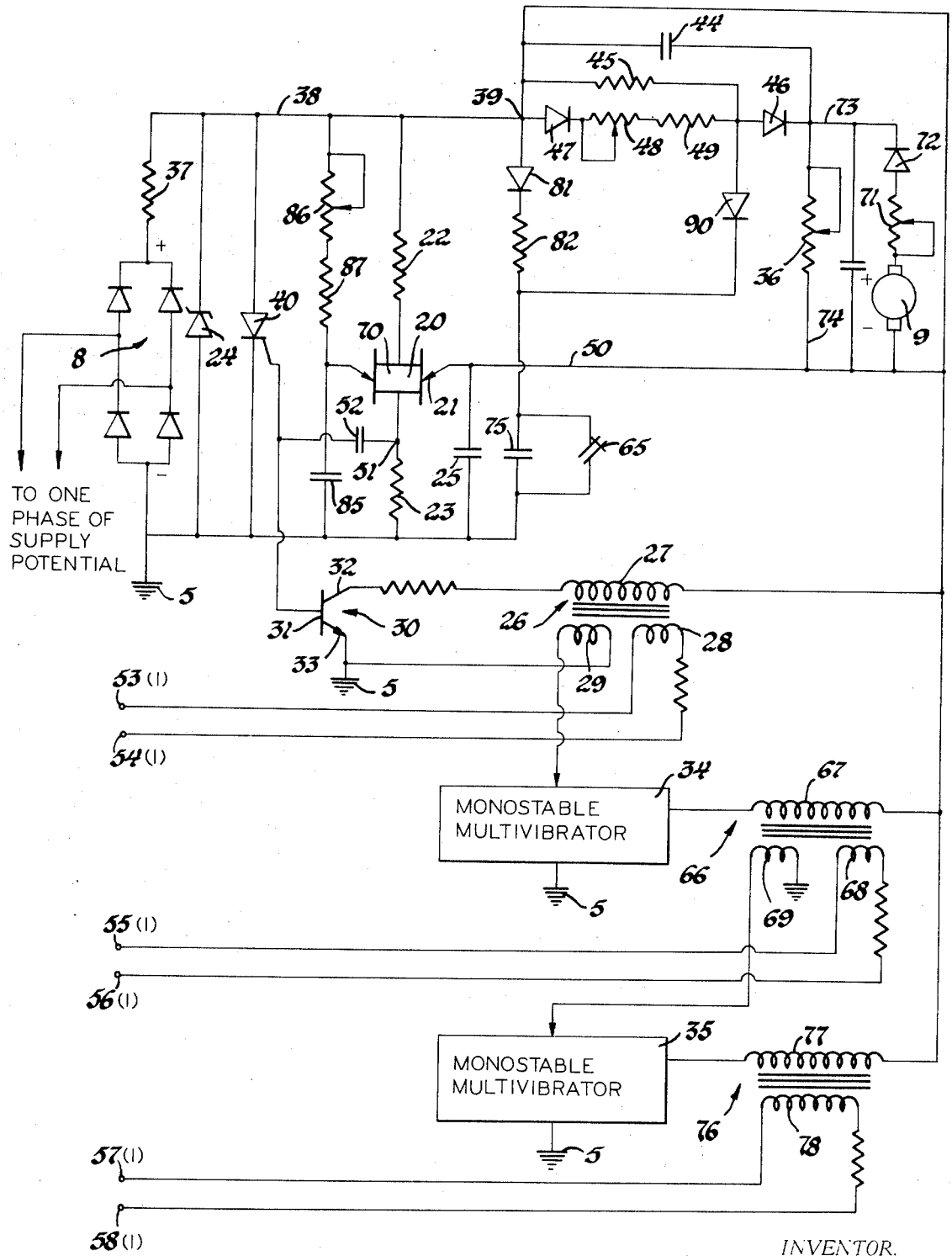
FIG. 1 is a schematic diagram of the improved motor speed control system for alternating current induction motors of this invention.

As the point of reference or ground potential is the same point electrically throughout the system, it has been illustrated by the accepted schematic symbol and referenced by the numeral 5 in FIG. 1 of the drawings.

That portion of the circuit of FIG. 1 including a unijunction transistor type relaxation oscillator circuit comprising unijunction transistor 20, timing capacitor 25 and base resistors 22 and 23; type NPN transistor 30 and transformer 26 having a primary winding 27 and two secondary windings 28 and 29 and the blocks referenced by the numerals 34 and 35 comprise circuitry responsive to a difference of magnitude between a direct current reference potential and a direct current control potential for producing a trigger signal at the electrical angle of each potential cycle of each phase of the alternating current supply potential as determined by the magnitude of the difference.

The circuitry represented by blocks 34 and 35 may be conventional monostable multivibrator circuits well known in the art. Consequently, as these circuits per se form no part of this invention, each has been illustrated in block form.

The circuitry comprising the unijunction transistor type relaxation oscillator circuit, type PNP transistor 30 and transformer 26 is a master trigger signal producing circuit which produces a trigger signal at the electrical angle of each potential cycle of the reference phase of the supply potential as determined by the magnitude of the difference between the reference and control potentials.

Each of monostable multivibrator circuits 34 and 35 is a slave trigger signal producing circuit connected in cascade with the master trigger signal producing circuit and responsive to the trigger signal produced by the next preceding trigger signal producing circuit to produce a trigger signal corresponding to a respective other phase of the alternating current supply potential and spaced from each other by an electrical angle equal to the electrical angle between phases of the alternating current supply potential.

To produce a direct current reference potential in synchronism with a selected phase of the supply potential, one phase of the alternating current supply potential may be rectified by a full-wave diode bridge rectifier circuit, generally shown by reference numeral 8 in FIG. 1 and hereinafter referred to as the source of reference potential, which produces a pulsating direct current potential, hereinafter referred to as the reference potential.

The reference potential, which may be regulated by a Zener diode 24, is connected across the series combination of an impedance element, which may be a variable resistance 36, and timing capacitor 25 through a circuit which may be traced from the positive polarity direct current output terminal of rectifier circuit 8, through resistor 37, lead 38, the parallel combination of capacitor 44, resistor 45 and diode 46, and diode 47, potentiometer 48 and resistor 49 in series, through variable resistance 36, lead 50, timing capacitor 25 and point of reference or ground potential 5 to the negative polarity direct current output terminal of rectifier circuit 8.

Timing capacitor 25 is charged by the reference potential and, when the charge thereupon which is applied across the emitter electrode 21 and one of the base electrodes of unijunction transistor 20, reaches a magnitude substantially equal to the peak point potential of unijunction transistor 20, this device switches to a low resistance or conducting state. With unijunction transistor 20 conducting, timing capacitor 25 discharges through the emitter-base junction of unijunction transistor 20 and base resistor 23. When the potential applied to emitter electrode 21 decreases to a value which is of insufficient magnitude to maintain unijunction transistor 20 conducting as timing capacitor 25 discharges, the unijunction transistor 20 reverts to its high resistance or nonconducting state and the cycle just described is repeated. Upon each discharge of timing capacitor 25 through base resistor 23, a trigger signal potential is produced thereacross which is of a positive polarity upon junction 51 with respect to point of reference or ground potential 5.

As only one trigger signal is required during each potential cycle of each phase and since the relaxation oscillator circuit is normally free-running, as described in the preceding paragraph, it is necessary that the relaxation oscillator circuit be disenabled during the remainder of each potential cycle after a trigger signal has been produced. To disenable the relaxation oscillator circuit upon the production of a trigger signal, silicon controlled rectifier 40 is provided. The trigger signal appearing across resistor 23 is applied through coupling capacitor 52 across the gate-cathode electrodes of silicon controlled rectifier 40 in the proper polarity relationship to produce conduction through the anode-cathode electrodes thereof. Conducting silicon controlled rectifier 40 removes the interbase potential from unijunction transistor 20 as conducting silicon controlled rectifier 40 is substantially a short circuit across the direct current terminals of rectifier bridge 8.

The trigger signal appearing across base resistor 23 is also applied through coupling capacitor 52 across the base electrode 31 and emitter electrode 33 of type NPN transistor 30 in the proper polarity relationship to produce base-emitter current flow through this type of NPN transistor. The resulting current flow through collector electrode 32 and emitter electrode 33 completes an energizing circuit for primary winding 27 of transformer 26. As the flow of current through primary winding 27 increases from zero, a potential is induced in each of secondary windings 28 and 29. The potential induced in secondary winding 28, which is poled in such a manner that the potential upon output terminal 53(1) is of a positive polarity with respect to output terminal 54(1), is applied across the gate-cathode electrodes of silicon controlled rectifier 10 of FIG. 2 through output terminals 53(1) and 54(1) of FIG. 1 and input terminals 53(2) and 54(2) of FIG. 2, respectively, in the proper polarity relationship to trigger silicon controlled rectifier 10 conductive to complete an energizing circuit for phase winding A through phase winding B. The potential induced in secondary winding 29 triggers monostable multivibrator 34 to the alternate state to complete an energizing circuit for primary winding 67 of transformer 66. Monostable multivibrator 34 remains in the alternate state for a period of time corresponding to 120 electrical degrees, the number of electrical degrees between phases of a three-phase supply potential, and spontaneously returns to the stable state to interrupt the energizing circuit for primary winding 67. The resulting collapsing magnetic field induces a potential in each of secondary windings 68 and 69. The potential induced in secondary winding 68, which is poled in such a manner that the potential upon output terminal 55(1) is of a positive polarity with respect to output terminal 56(1), is applied across the gate-cathode electrodes of silicon controlled rectifier 11 of FIG. 2 through output terminals 55(1) and 56(1) of FIG. 1 and input terminals 55(2) and 56(2) of FIG. 2, respectively, in the proper polarity relationship to trigger silicon controlled rectifier 11 conductive to complete an energizing circuit for phase winding B through phase winding C. The potential induced in secondary winding 69 triggers monostable multivibrator 35 to the alternate state to complete an energizing circuit for primary winding 77 of transformer 76. Monostable multivibrator 35 remains in the alternate state for a period of time corresponding to 120 electrical degrees and spontaneously returns to the stable state to interrupt the energizing circuit for primary winding 77. The resulting collapsing magnetic field induces a potential in secondary winding 78 of a positive polarity upon output terminal 57(1) with respect to output terminal 58(1) which is applied across the gate-cathode electrodes of silicon controlled rectifier 12 of FIG. 2 through output terminals 57(1) and 58(1) of FIG. 1 and input terminals 57(2) and 58(2) of FIG. 2, respectively, to trigger this device conductive to complete an energizing circuit for phase winding C through phase winding A. The circuitry of FIG. 1 may also be used with a delta connected induction motor as shown in FIG. 3. To connect the configuration of FIG. 3 into the circuitry of FIG. 1, coils 59 and 60 of FIG. 3 are magnetically coupled to primary winding 27 of FIG. 1 in place of secondary winding 28, coils 61 and 62 of FIG. 3 are magnetically coupled to primary winding 67 of FIG. 1 in place of secondary winding 68 and coils 63 and 64 of FIG. 3 are magnetically coupled to primary winding 77 of FIG. 1 in place of secondary winding 78. The coils of FIG. 3 are, of course, so poled to produce the correct potential polarity relationship across the gate-cathode electrodes of each respective silicon controlled rectifier. A complete detailed description of this circuit is set forth in the aforereferenced U.S. Pat. No. 3,387,196.

The conduction angle over which each phase winding is energized by the corresponding phase of the supply potential is determined by the electrical angle during each potential cycle of each phase of the supply potential at which each respective trigger signal is produced, the earlier during each potential half cycle that the trigger signal is produced, the greater the conduction angle. The speed of the motor, of course, increases with an increase of the conduction angle.

Timing capacitor 25 begins to charge with the appearance of the reference potential and triggers unijunction transistor 20 to conduction to produce a master trigger signal across base resistor 23 at the electrical angle of each cycle of the reference phase of the supply potential at which the charge upon timing capacitor 25 has reached a magnitude substantially equal to the peak point potential of unijunction transistor 20. To change the conduction angle, therefore, the time required for the charge on timing capacitor 25 to reach a magnitude substantially equal to the peak point potential of unijunction transistor 20 may be varied In capacitor charging circuits, the capacitor will charge substantially exponentially to substantially full potential in a period of time which is substantially equal to four times the time constant of the circuit regardless of the magnitude of the potential to which it is charged. Therefore, the initial substantially linear rate of charge is determined, to a great extent, by the magnitude of the potential charge, the greater the magnitude of the charge the greater the initial rate.

According to Kirchoff's second law, the sum of the potential drops in any complete or closed circuit must equal the sum of the potential rises in that circuit. In applying this law, tracing through any single circuit, whether it is by itself or a part of a network, a potential drop exists when tracing through a resistance with or in the same direction as the current or through a battery or generator against their potential, from positive to negative, and a voltage rise exists when tracing through a resistance against or in a direction opposite to the current, or through a battery or a generator in a direction with their potential, negative to positive.

Considering Zener diode 24 as a potential generator, the sum of the potential drops across the parallel combination of capacitor 44, resistor 45 and diode 46 in series and diode 47, potentiometer 48 and resistor 49 in series, across variable resistance 36, across timing capacitor 25 and across the resistance of the interconnecting wires must equal the potential rise across Zener diode 24. Consequently, the magnitude of the potential charge upon timing capacitor 25 is equal to the potential drop thereacross in this loop.

As the circuit components included in the loop just considered and the frequency and amplitude of the alternating current supply potential and, therefore, the reference potential, remain substantially constant, the variable parameter necessary to control motor speed may be a direct current control potential, which not only is related to and varies in magnitude with motor speed but which is also selectively variable in magnitude for varying the speed of the motor, applied across variable resistance 36.

One method for producing a direct current control potential which varies with motor speed is an electric tachometer driven by the motor shaft which produces a direct current output potential of a magnitude proportional to motor speed. Commercially available tachometers of this type are small direct current generators which produce a direct current output potential which increases and decreases linearly in magnitude with increases and decreases of motor speed. As electrical tachometers of this type are well known in the art and form no part of this invention, it has been schematically illustrated as a circle in FIG. 1 and referenced by the numeral 9. The output direct current potential of tachometer 9 will hereinafter be referred to as the control potential.

The control potential is connected across the impedance element, variable resistance 36, through a circuit which may be traced from the positive polarity output terminal of tachometer 9, through potentiometer 71, diode 72, lead 73, variable resistance 36 and leads 74 and 50 to the negative polarity terminal of tachometer 9. The magnitude of the control potential may be selectively varied by adjusting the movable contact of potentiometer 71 to adjust motor speed. With the control potential applied across variable resistance 36 and poled as shown in FIG. 1, this variable resistance may be considered a potential generator. Tracing through the same loop in the same direction and with the potential applied across variable resistance 36 poled as shown in FIG. 1, the potential appearing across variable resistance 36 is a potential drop for purposes of Kirchoff's second law. As the reference potential across Zener diode 24 and the value of the circuit components remain substantially constant, the increase in magnitude of the potential drop across variable resistance 36 introduced by the control potential applied thereacross must be accompanied by a corresponding decrease in potential drop across timing capacitor 25 to satisfy Kirchoff's second law. As the potential drop across timing capacitor 25 determines the magnitude of the charge thereon, the initial rate of charge of timing capacitor 25 and, therefore, the time required for the charge to increase in magnitude to the peak point potential of unijunction transistor 20 is determined by the magnitude of the difference between the reference and control potentials which may be varied by varying the magnitude of the control potential applied across variable resistance 36.

It is apparent, therefore, that upon motor start, the control potential is zero and the magnitude of the difference between the reference and control potentials is maximum. Consequently, the full charging potential of the reference potential is applied across timing capacitor 25 to rapidly charge this device to the peak point potential of unijunction transistor 20. As point occurs substantially at the beginning of each potential cycle of the reference phase, substantially full potential is applied across the motor.

To establish the difference of magnitude between the reference potential and the control potential at substantially zero upon motor start and to increase the difference in magnitude at a predetermined rate to a maximum as determined by the selected magnitude of the control potential, a capacitor 75 is connected across the series combination of the impedance element, variable resistance 36 and timing capacitor 25 through a circuit which may be traced from junction 39, through diode 81, resistor 82, capacitor 75 to point of reference or ground potential 5.

Upon motor start, normally closed contact 65, which may be one of the normally closed contacts of the associated motor starter relay, is operated to the circuit open condition. Consequently, capacitor 75 begins to charge through diode 81 and resistor 82. With capacitor 75 charging, junction 39 is at substantially ground potential. Consequently, charging capacitor 75 establishes the difference in magnitude between the reference and control potentials, and consequently the magnitude of the charging potential for timing capacitor 25, at substantially zero upon motor start. Capacitor 85, however, begins to charge through variable resistance 86 and resistor 87 until it has reached a magnitude equal to the peak point potential of unijunction transistor 70. Upon the conduction of unijunction transistor 70, capacitor 85 discharges through the emitter-base junction thereof and base resistor 23 to produce a trigger potential signal thereacross of a positive polarity upon junction 51 with respect to point of reference or ground potential 5. This trigger signal gates silicon controlled rectifier 40 conductive to disenable the master trigger signal producing circuit for the remainder of this potential cycle, provides a trigger signal across output terminals 53(1) and 54(1) and initiates the action of the slave trigger signal circuitry in a manner previously described. By properly adjusting variable resistor 86, the electrical angle at which capacitor 85 has become charged to the peak point potential of unijunction transistor 70 may be established near the end of each positive polarity half-cycle of the reference phase of the supply potential. Consequently, the trigger signal for each potential cycle of the supply potential occurs near the end of each positive polarity half-cycle to provide a reduced voltage across the motor upon start.

As capacitor 75 continues to charge and the motor begins to run, the potential upon junction 39 begins to increase in magnitude and the magnitude of the control potential across variable resistance 36 increases. Consequently, the magnitude of the difference between the reference and control potentials and, consequently, the charging potential for timing capacitor 25 begins to increase in magnitude. This increase in magnitude charges timing capacitor earlier during each potential cycle of the reference phase of the supply potential to produce the trigger signals earlier during each potential half-cycle of each phase of the supply potential to increase the conduction angle and, consequently, the speed of the motor. The difference in magnitude between the reference and control potentials and, consequently, the charging potential for timing capacitor 25 continues to increase at a predetermined rate as determined by the time constant of the charging circuit for capacitor 75 to a maximum value as determined by the selected magnitude of the control potential. Consequently, the speed of the motor continues to increase until it is operating at a speed as determined by the setting of the movable contact of potentiometer 71 and capacitor 75 is of no further consequence although it continues to take a charge through diode 90 until charged to the full reference potential. As the capacitor 75 is no longer effective, the speed control system operates in the normal manner.

Upon the shutdown of the motor, the normally closed contacts 65 of the associated controller relay close to discharge capacitor 75 and prepare the system for the next motor start.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. A speed control system for alternating current motors of the type having discrete phase windings corresponding to each phase of a compatible alternating current supply potential comprising, means for producing a reference potential in synchronism with a selected phase of said alternating current supply potential, means for producing a control potential which varies in magnitude with changes of motor speed, means for selectively varying the magnitude of said control potential for varying the speed of said motor, means including a unijunction transistor type relaxation oscillator circuit having a timing capacitor responsive to a difference in magnitude between said reference potential and said control potential for producing a trigger signal at the electrical angle of each potential cycle of each phase of said alternating current supply potential as determined by the magnitude of said difference, means for establishing said difference of magnitude between said reference potential and said control potential at substantially zero upon motor start and for increasing said difference in magnitude at a predetermined rate to a maximum as determined by the selected magnitude of said control potential, and controllable switching circuit means corresponding to each phase of said alternating current supply potential for completing an energizing circuit for the corresponding said phase windings in response to respective said trigger signals.

2. A speed control system for alternating current motors of the type having discrete phase windings corresponding to each phase of a compatible alternating current supply potential comprising, means for producing a reference potential in synchronism with a selected phase of said alternating current supply potential, means for producing a control potential which varies in magnitude with changes of motor speed, means for selectively varying the magnitude of said control potential for varying the speed of said motor, means including a unijunction transistor type relaxation oscillator circuit having a timing capacitor charged by a charging potential of a magnitude determined by the difference in magnitude between said reference potential and said control potential for producing a trigger signal at the electrical angle of each potential cycle of each phase of said alternating current supply potential as determined by the magnitude of said difference, means for increasing the magnitude of said capacitor charging potential at a predetermined rate from substantially zero upon motor start to a maximum as determined by the selected magnitude of said control potential, and controllable switching circuit means corresponding to each phase of said alternating current supply potential for completing an energizing circuit for the corresponding said phase windings in response to respective said trigger signals.

3. A speed control system for alternating current motors of the type having discrete phase windings corresponding to each phase of a compatible alternating current supply potential comprising, means for producing a reference potential in synchronism with a selected phase of said alternating current supply potential, means for producing a control potential which varies in magnitude with changes of motor speed, means for selectively varying the magnitude of said control potential for varying the speed of said motor, means including a unijunction transistor type relaxation oscillator circuit having a timing capacitor responsive to a difference in magnitude between said reference potential and said control potential for producing a trigger signal at the electrical angle of each potential cycle of each phase of said alternating current supply potential as determined by the magnitude of said difference, an impedance element, means for connecting said reference potential across the series combination of said impedance element and said timing capacitor, means for connecting said control potential across said impedance element in the same polarity relationship as said reference potential, a capacitor, means for connecting said capacitor across said series combination of said impedance element and said timing capacitor, and controllable switching circuit means corresponding to each phase of said alternating current supply potential for completing an energizing circuit for the corresponding said phase windings in response to respective said trigger signals.

* * * * *